(12) United States Patent
Shitahaku (10) Patent No.: US 7,146,193 B2
(45) Date of Patent: Dec. 5, 2006

(54) PORTABLE TELEPHONE SET AND WINDOW SWITCHING CONTROL METHOD

(75) Inventor: Jun Shitahaku, Tokyo (JP)

(73) Assignee: NEC Corporation (JP)

( * ) Notice: Subject to any disclaimer, the term of this patent is extended or adjusted under 35 U.S.C. 154(b) by 736 days.

(21) Appl. No.: 09/961,890

(22) Filed: Sep. 24, 2001

(65) Prior Publication Data

US 2002/0037753 A1 Mar. 28, 2002

(30) Foreign Application Priority Data

Sep. 27, 2000 (JP) ............................. 2000-293233

(51) Int. Cl.
*H04B 1/38* (2006.01)
(52) U.S. Cl. .................... 455/566; 455/550.1; 455/418
(58) Field of Classification Search ................ 455/403, 455/418, 550.1, 556.1, 566; 715/700, 729, 715/764–766, 781, 788, 704–807; 379/93.17
See application file for complete search history.

(56) References Cited

U.S. PATENT DOCUMENTS 5,438,661 A * 8/1995 Ogawa ........................ 715/804
6,147,684 A * 11/2000 Nielsen et al. ............... 715/803
6,177,936 B1 * 1/2001 Cragun ........................ 715/760
6,285,364 B1   9/2001 Giordano, III et al.
6,411,275 B1 * 6/2002 Hedberg ...................... 345/156
6,724,403 B1 * 4/2004 Santoro et al. .............. 715/765

FOREIGN PATENT DOCUMENTS

| EP | 0889402 | | 1/1999 |
|---|---|---|---|
| EP | 1037164 | | 9/2000 |
| EP | 1168148 | | 1/2002 |
| JP | 05233195 A | * | 9/1993 |
| JP | 05250126 A | * | 9/1993 |
| JP | 08212039 A | * | 8/1996 |
| JP | 2000-224664 | | 8/2000 |

* cited by examiner

*Primary Examiner*—Melur Ramakrishnaiah
(74) *Attorney, Agent, or Firm*—Dickstein, Shapiro, LLP.

(57) ABSTRACT

A portable telephone set using a Window System for controlling the rendering timing of a display window of each function includes a history management section, priority management section, and operation control section. The history management section manages the history of the display window of each function. The priority management section manages the priority level of the display window of each function. The operation control section controls switching of the display window of each function on the basis of management contents of the history management section and priority management section.

8 Claims, 9 Drawing Sheets

| APPLICATION | PRIORITY |
|---|---|
| TERMINATION WINDOW | 3 |
| SCHEDULE NOTIFICATION WINDOW | 2 |
| STANDBY WINDOW | 1 |

FIG.6

| APPLICATION | OPERATION STATE |
|---|---|
| TERMINATION WINDOW | ACTIVE |
| SCHEDULE NOTIFICATION WINDOW | QUIT |
| STANDBY WINDOW | ACTIVE |

FIG.7

| APPLICATION | OPERATION STATE |
|---|---|
| TERMINATION WINDOW | ACTIVE |
| SCHEDULE NOTIFICATION WINDOW | ACTIVE |
| STANDBY WINDOW | ACTIVE |

FIG.8

| PRIORITY | HISTORY | | |
|---|---|---|---|
| 3 | TERMINATION WINDOW | | |
| 2 | SCHEDULE NOTIFICATION WINDOW | | |
| 1 | STANDBY WINDOW | | |

FIG.9

| PRIORITY | HISTORY | | |
|---|---|---|---|
| 3 | TERMINATION WINDOW | | |
| 2 | SCHEDULE NOTIFICATION WINDOW | | |
| 1 | STANDBY WINDOW | | |

FIG.11

| APPLICATION | PRIORITY |
|---|---|
| A | 1 |
| B | 1 |

FIG.12

| APPLICATION | OPERATION STATE |
|---|---|
| A | ACTIVE |
| B | QUIT |

FIG.13

| PRIORITY | HISTORY | | |
|---|---|---|---|
| 3 | | | |
| 2 | | | |
| 1 | A | B | |

FIG.14

| PRIORITY | HISTORY | | |
|---|---|---|---|
| 3 | | | |
| 2 | | | |
| 1 | A | B | B |

FIG.15

PORTABLE TELEPHONE SET AND WINDOW SWITCHING CONTROL METHOD

BACKGROUND OF THE INVENTION

1. Field of the Invention

The present invention relates to a portable telephone set and a window switching control method used therefor and, more particularly, to window display switching control on a portable telephone set used for a mobile communication system.

2. Description of the Prior Art

A conventional portable telephone set is designed to display a standby window, a termination window, a schedule notification window, a menu window, various setting windows, and the like. Functions corresponding to these windows, i.e., a standby function, a termination function, a schedule notification function, a menu function, various setting functions, and the like, render the corresponding windows.

Recently, a portable telephone set has been equipped with additional functions such as an electronic mail function and Internet site (content) display function, and its various functions have improved. With this improvement, the number of corresponding windows has also increased. The above functions are implemented by application programs stored in the portable telephone set.

In the above conventional portable telephone set, windows corresponding to various functions are asynchronously displayed. If an incoming call is received while the window corresponding to the schedule notification function, menu function, or electronic mail input function is displayed, a plurality of keys must be operated to switch the window to the window corresponding to the termination function (e.g., a window for displaying originator information), and complicated control is required to prevent a conflict between window control operations based on key operation and the like.

Conventionally, each of the above functions renders a corresponding window. However, each function cannot be separated from the remaining functions because of consideration given to rendering operations performed by the remaining functions. In this case, the use of the Window System makes it possible to maintain the independence of each function window. However, this requires an increase in memory capacity and complicated window switching control.

SUMMARY OF THE INVENTION

The present invention has been made to solve the above problems in the prior art, and has as its object to provide a portable telephone set which can easily switch windows between various functions without increasing the memory capacity and complicating window switching control between the respective functions, and a window switching control method used for the portable telephone set.

In order to achieve the above object, according to the first aspect of the present invention, there is provided a portable telephone set using a Window System for controlling a rendering timing of a display window of each function, comprising history management means for managing a history of the display window of each function, priority management means for managing a priority level of the display window of each function, and operation control means for controlling switching of the display window of each function on the basis of management contents of the history management means and the priority management means.

In addition, in order to achieve the above object, according to the second aspect of the present invention, there is provided a window switching control method for a portable telephone set using a Window System for controlling a rendering timing of a display window of each function, comprising the step of controlling switching of windows of functions on the basis of management contents of history management means for managing a history of the display window of each function and priority management means for managing a priority level of the display window of each function.

A portable telephone set using a Window System according to the present invention includes an operation control section for controlling switching of the windows of various functions (application programs), a history management section for managing the history of the window of each function, and a priority management section for managing the priority of the window of each function.

Since the operation control by the above operation control section can control disposal and reproduction of a window that is not displayed by one application program, memory capacity savings can be attained. In addition, since the independence of the window of each application program is ensured by the Window System, the rendering processing can be simplified.

History management done by the history management section allows formation of a structure in which not much consideration need be given to the relationship between a given application program and each of the remaining applications. This makes it possible to simplify the control.

When a plurality of windows contend with each other, the priority management section performs priority management to simplify the mechanism of displaying a window with high priority.

As described above, according to the present invention, in a portable telephone set using a Window System for controlling rendering timings of the display windows of various functions, switching of the windows of the respective functions is controlled on the basis of the management contents of a history management means for managing the history of the display window of each function and a priority management means for managing the priority of the display window of each function. This makes it possible to facilitate switching of the windows of the respective functions without increasing the memory capacity and complicating window switching control between the respective functions.

The above and many other objects, features and advantages of the present invention will become manifest to those skilled in the art upon making reference to the following detailed description and accompanying renderings in which preferred embodiments incorporating the principle of the invention are shown by way of illustrative examples.

DETAILED DESCRIPTION OF THE PREFERRED EMBODIMENTS

Several preferred embodiments of the present invention will be described below with reference to the accompanying renderings.

Figure 1:
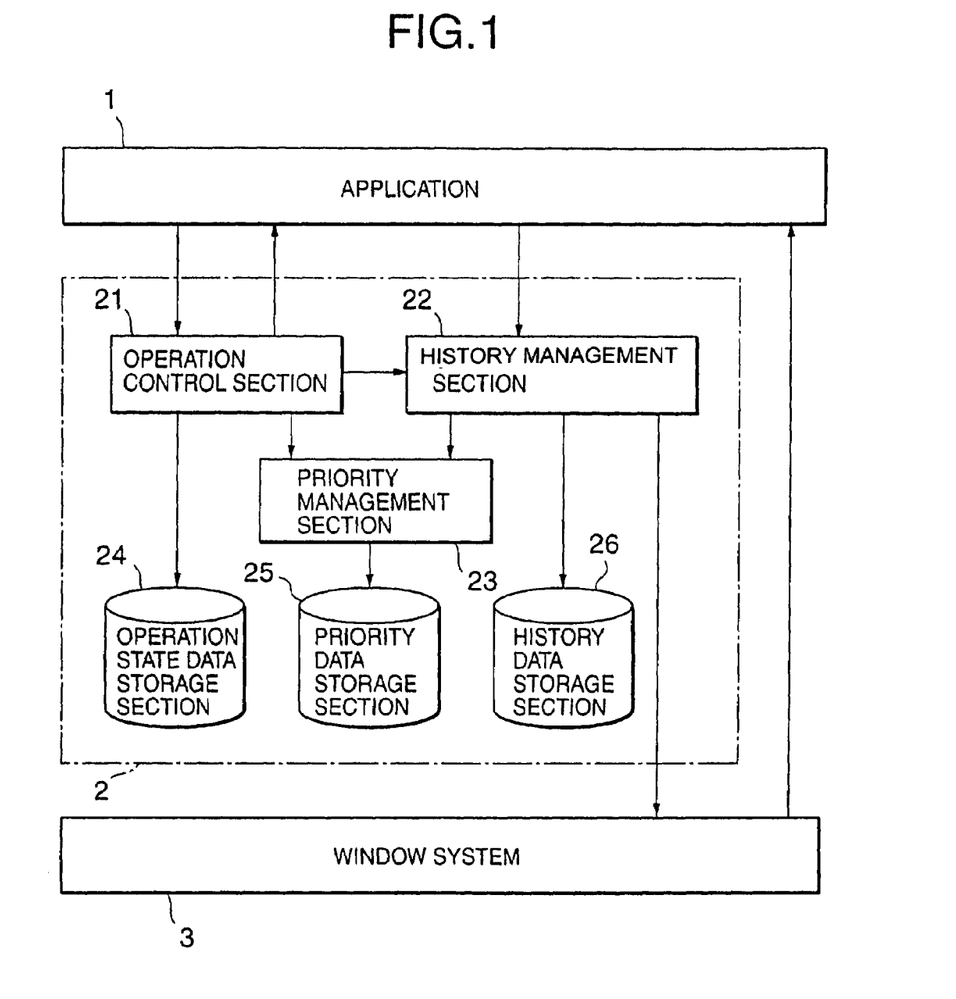
FIG. 1 is a block diagram showing the arrangement of the main part of a portable telephone set according to the first embodiment of the present invention.

FIG. 1 is a block diagram showing the arrangement of the main part of a portable telephone set according to the first embodiment of the present invention. Referring to FIG. 1, the portable telephone set according to the first embodiment of the present invention is comprised of an application program (to be simply referred to as an application hereinafter) 1, application control function 2, and Window System 3.

The application control function 2 is comprised of an operation control section 21, history management section 22, priority management section 23, operation state data storage section 24, priority data storage section 25, and history data storage section 26.

The application 1 is constituted by a plurality of applications and serves to display a window in response to button operation or an asynchronous event and instruct the application control function 2 to launch/quit each of a plurality of applications or make a corresponding window active.

The application control function 2 controls the application 1 in accordance with an instruction from the application 1. The Window System 3 controls the rendering timing of a window of the application 1.

The operation control section 21 controls the launch/quit of a designated application by sending a launch event or quit event in accordance with a launch or quit instruction from the application 1.

Upon reception of a launch instruction from the application 1, the operation control section 21 updates the data in the operation state data storage section 24. The history management section 22 then records the rank of the state (history) of the application 1 in correspondence with the priority of the launch/quit of the application 1. When the application 1 quits, the history management section 22 controls the Window System 3 to make the specific application 1 active. The priority management section 23 manages the priority of each application 1.

The operation state data storage section 24 stores the launch/quit state of each application 1. The priority data storage section 25 stores the priority of each application 1. The history data storage section 26 records the start-up sequence of the applications 1.

Figure 2:
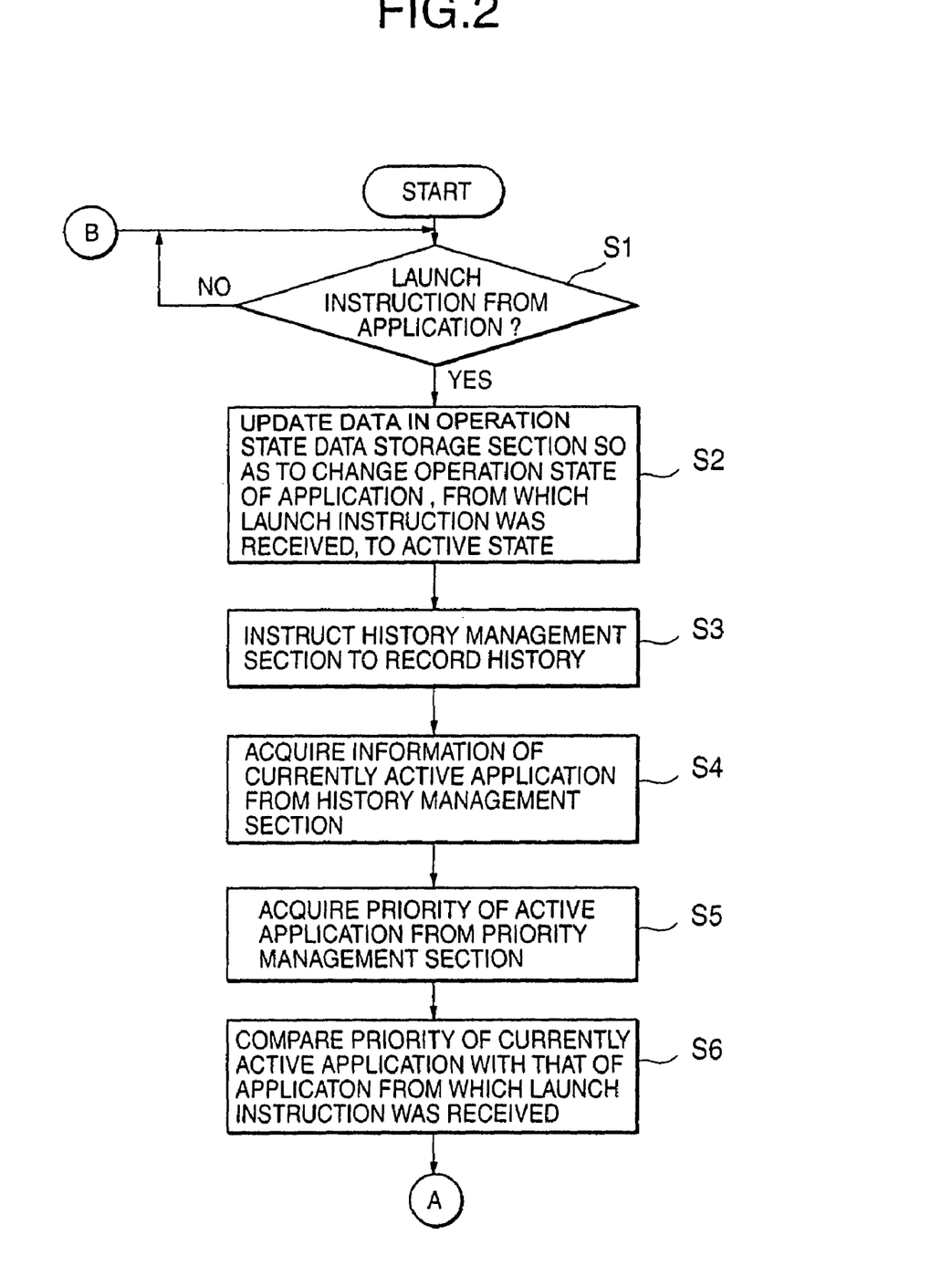
FIG. 2 is a flow chart showing the operation of the portable telephone set according to the first embodiment of the present invention.
Figure 3:
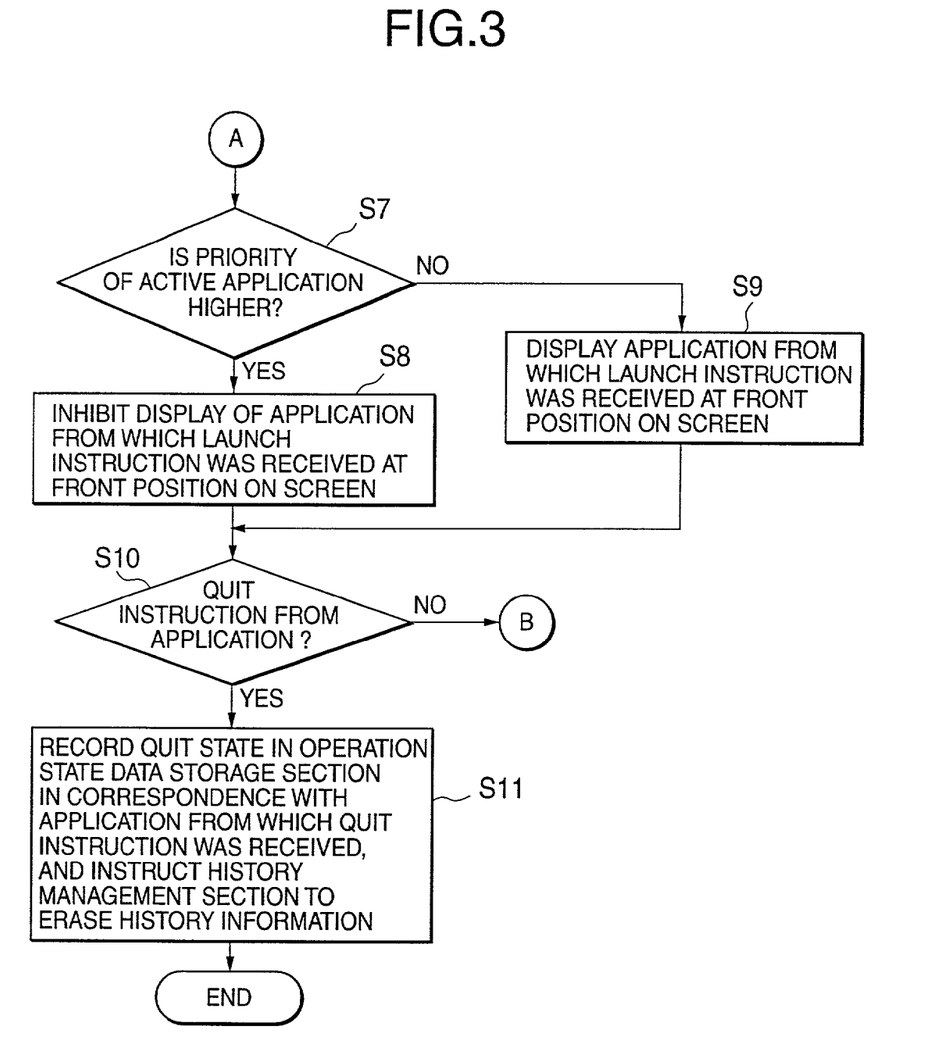
FIG. 3 is a flow chart showing the operation of the portable telephone set according to the first embodiment of the present invention.

FIGS. 2 and 3 are flow charts showing the operation of the portable telephone set according to the first embodiment of the present invention. The operation of the portable telephone set according to the first embodiment of the present invention will be described with reference to FIGS. 1 to 3.

Upon reception of a launch instruction from the application 1 (step S1 in FIG. 2), the operation control section 21 updates the data in the operation state data storage section 24 so as to change the operation state of the application 1, from which the launch instruction was received, to the active state (step S2 in FIG. 2), and instructs the history management section 22 to record a history (step S3 in FIG. 2). The history management section 22 records the information of the application 1 to be launched in the history data storage section 26.

The operation control section 21 then acquires the information of the application 1 displayed at the front position on the screen from the history management section 22 (step S4 in FIG. 2), and acquires the priority of the application 1 at the front position of on the screen from the priority management section 23 (step S5 in FIG. 2).

The operation control section 21 compares the priority of the application currently displayed at the front position on the screen with the priority of the application from which the launch instruction was received (step S6 in FIG. 2). If the priority of the application currently displayed on the screen is higher than that of the application from which the launch instruction was received (step S7 in FIG. 3), the application from which the launch instruction was received is not made active (step S8 in FIG. 3).

If the priority of the currently active application that user sees is equal to or lower than that of the application from which the launch instruction was received (step S7 in FIG. 3), the operation control section 21 makes active the application from which the launch instruction was received.

Upon reception of a quit instruction from the application 1 (step S10 in FIG. 3), the operation control section 21 records, in the operation state data storage section 24, the quit state of the application from which the quit instruction was received, and instructs the history management section 22 to erase the history information (step S11 in FIG. 3). When the application quits, the history management section 22 searches the priority data storage section 25 for an application to be displayed next and displays it.

If no quit instruction is issued from the application 1 (step S10 in FIG. 3), the operation control section 21 returns to step S1 to repeat the above processing.

As described above, since the operation control by the operation control section 21 can control disposal and reproduction of a window that is not displayed by one application, memory capacity savings can be attained.

History management done by the history management section 22 allows formation of a structure in which not much consideration need be given to the relationship between the application 1 and each of the remaining applications. This makes it possible to simplify the control.

When a plurality of windows contend with each other, the priority management section 23 performs priority management to simplify the mechanism of displaying a window with high priority. In addition, since the independence of the window of each application is ensured by the Window System 3, the rendering processing can be simplified.

The above control done by the application control function 2 therefore facilitates switching of windows between the respective functions without increasing the memory capacity and complicating the window switching control between the respective functions.

Figure 4:
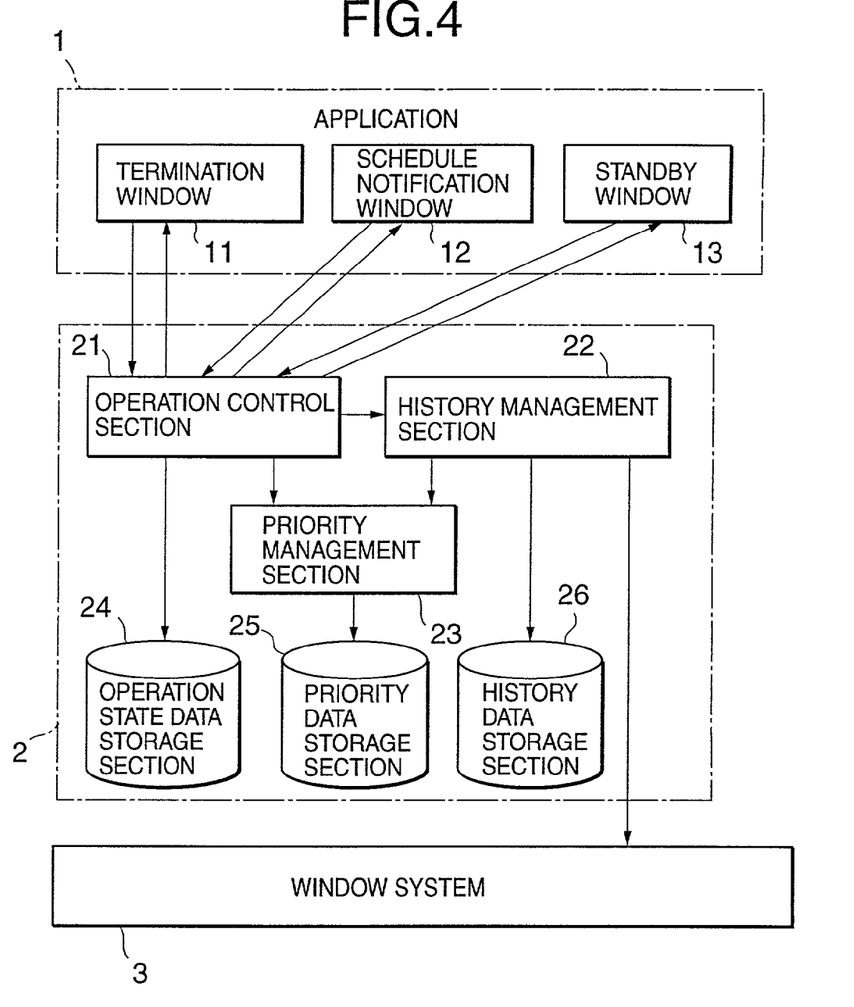
FIG. 4 is a block diagram showing the arrangement of the main part of a portable telephone set according to the second embodiment of the present invention.

FIG. 4 is a block diagram showing the arrangement of a portable telephone set according to the second embodiment of the present invention. Referring to FIG. 4, the portable telephone set according to the second embodiment of the present invention has the same arrangement as that of the portable telephone set according to the first embodiment of the present invention except that an application 1 incorporates a termination window 11, schedule notification window 12, and standby window 13. The same reference numerals as in the first embodiment denote the same parts in the second embodiment. The operations of identical constituent elements are the same as those in the first embodiment of the present invention.

Figure 5:
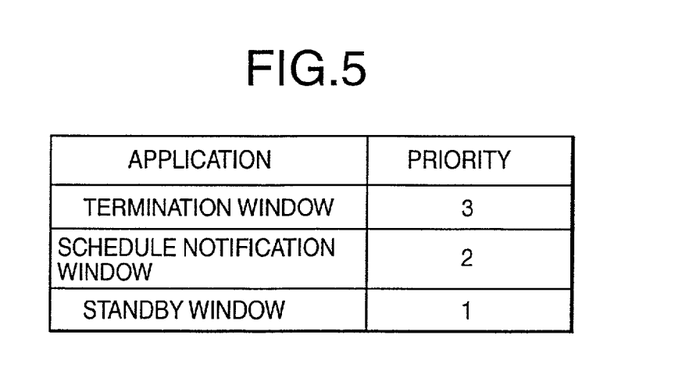
FIG. 5 is a table showing the priority data of the portable telephone set according to the second embodiment of the present invention.
Figure 6:
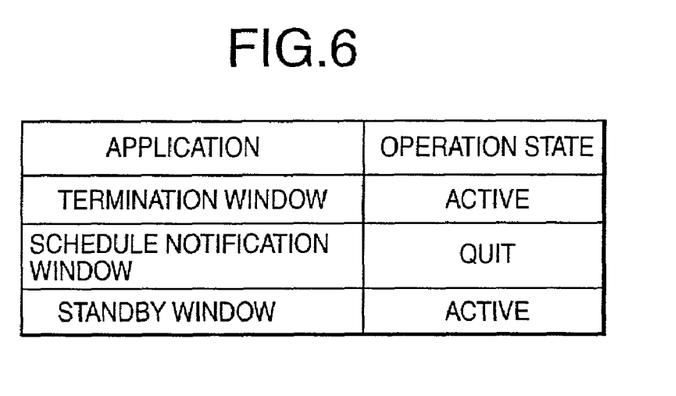
FIG. 6 is a table showing the operation state data of the portable telephone set according to the second embodiment of the present invention in an initial state.
Figure 7:
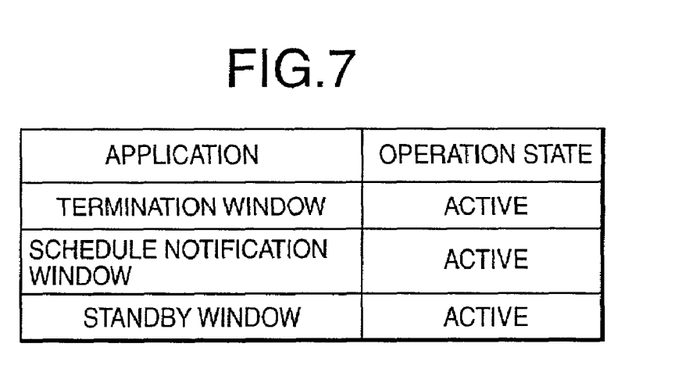
FIG. 7 is a table showing the operation state data of the portable telephone set according to the second embodiment of the present invention after startup.

FIG. 5 is a view showing the priority data of the portable telephone set according to the second embodiment of the present invention. FIG. 6 is a view showing the operation state data of the portable telephone set according to the second embodiment of the present invention in an initial state. FIG. 7 is a view showing the operation state data of the portable telephone set according to the second embodiment of the present invention after startup.

Figure 8:
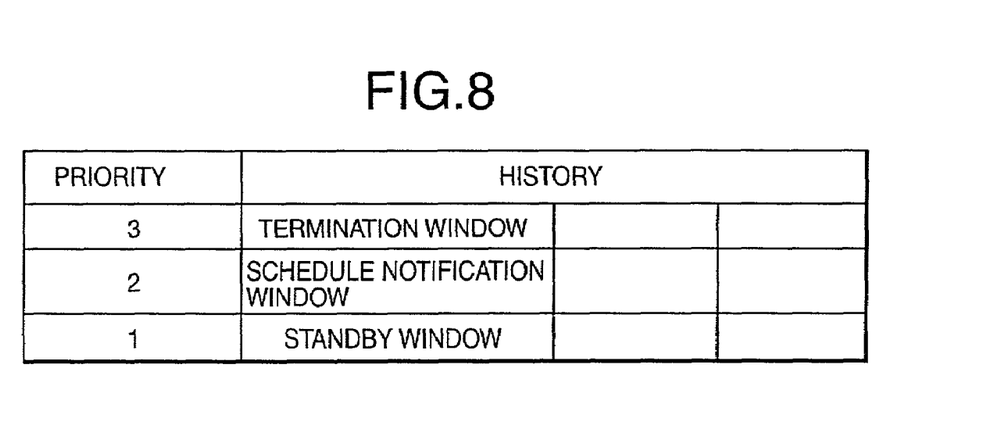
FIG. 8 is a table showing the history data of the portable telephone set according to the second embodiment of the present invention in an initial state.
Figure 9:
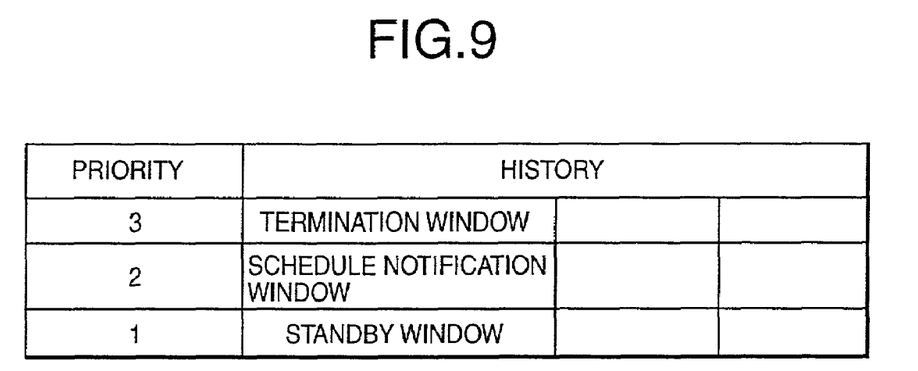
FIG. 9 is a table showing the history data of the portable telephone set according to the first embodiment of the present invention after startup.
Figure 10:
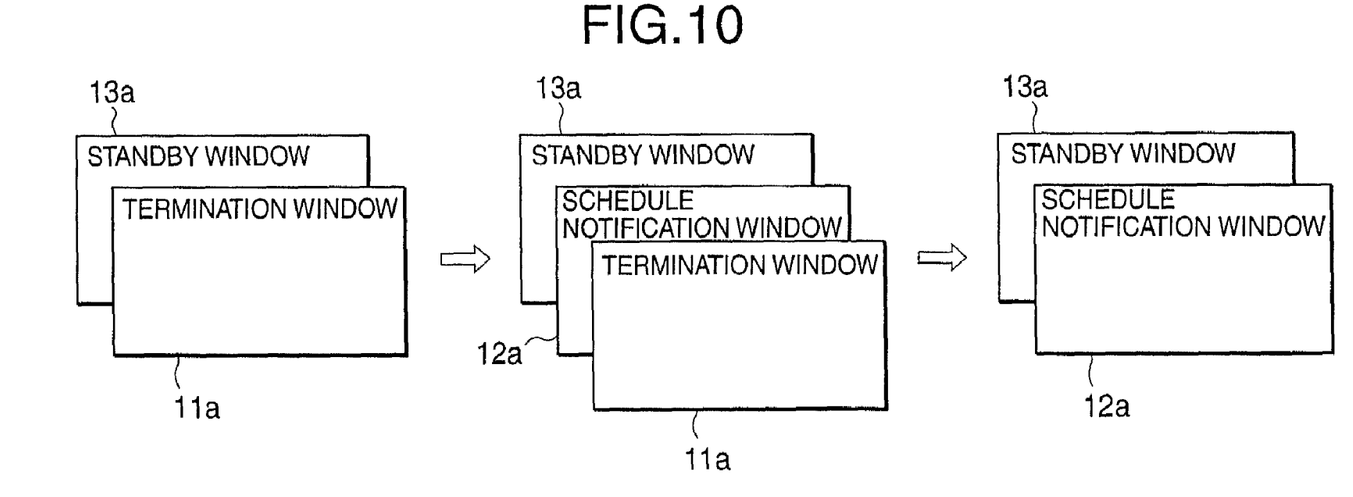
FIG. 10 is a view showing an example of how windows are displayed on the portable telephone set according to the second embodiment of the present invention.

FIG. 8 is a view showing the history data of the portable telephone set according to the second embodiment of the present invention in the initial state. FIG. 9 is a view showing the history data of the portable telephone set according to the second embodiment after launch. FIG. 10 is a view showing how windows are displayed on the portable telephone set according to the second embodiment of the present invention. Window display performed by the portable telephone set according to the second embodiment of the present invention will be described below with reference to FIGS. 4 to 10.

The second embodiment of the present invention exemplifies the case where if a termination window 11a is displayed when a schedule notification event occurs, a schedule notification window 12a is to be displayed after the termination window 11a quits.

When the operation state data shown in FIG. 6 is set, the schedule notification window 12 gives a launch instruction to an operation control section 21. The operation control section 21 acquires the information of the active application from a history management section 22.

The operation control section 21 acquires, from the history management table shown in FIG. 8, information indicating that the termination window 11a is being displayed, and also acquires the priority of the termination window 11a from the priority management table shown in FIG. 5.

Thereafter, the operation control section 21 compares the priority of the termination window 11a with that of the window corresponding to the launch request.

In this case, since the priority of the termination window 11a that has already been displayed is higher, the operation control section 21 updates the history information (see FIG. 9). After display of the termination window 11a is terminated, the schedule notification window 12a is set at the front position on the screen according to the history sequence. Therefore, display of the schedule notification window 12a is held until the end of the display of the termination window 11a (see FIG. 10). Referring to FIG. 10, reference numeral 13a denotes a standby window.

Figure 11:
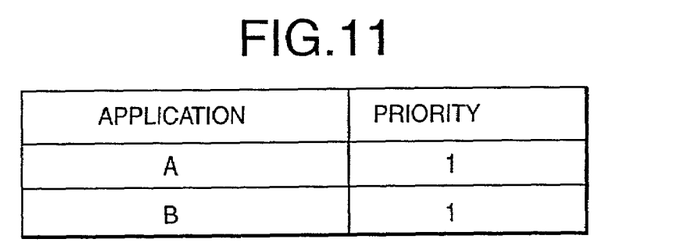
FIG. 11 is a table showing the priority data of a portable telephone set according to the third embodiment of the present invention.
Figure 12:
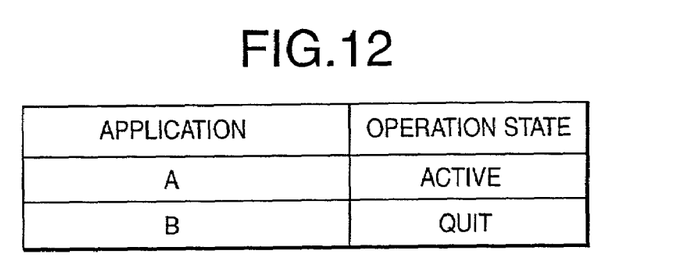
FIG. 12 is a table showing the operation state data of the portable telephone set according to the third embodiment of the present invention in an initial state.

FIG. 11 is a view showing the priority data of a portable telephone set according to the third embodiment of the present invention. FIG. 12 is a view showing the operation state data of the portable telephone set according to the third embodiment of the present invention in an initial state.

Figure 13:
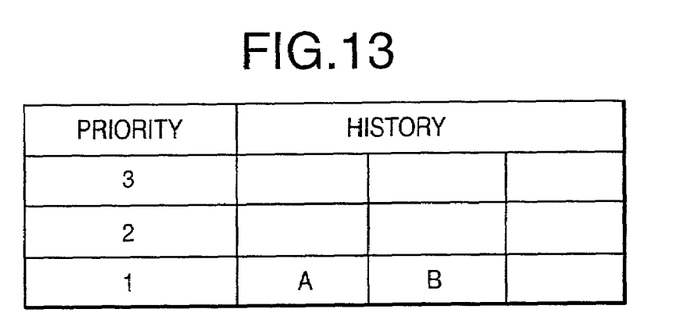
FIG. 13 is a table showing the history data of the portable telephone set according to the third embodiment of the present invention in the initial state.
Figure 14:
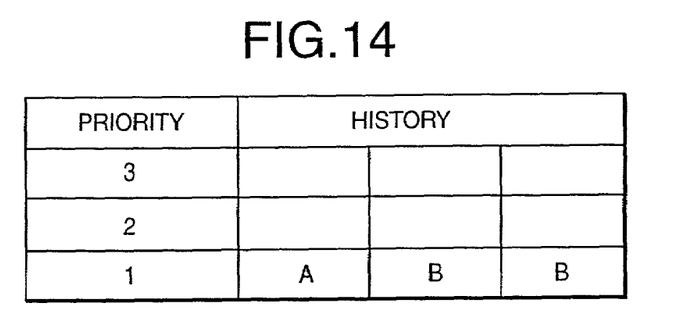
FIG. 14 is a table showing the history data of the portable telephone set according to the third embodiment of the present invention after startup.
Figure 15:
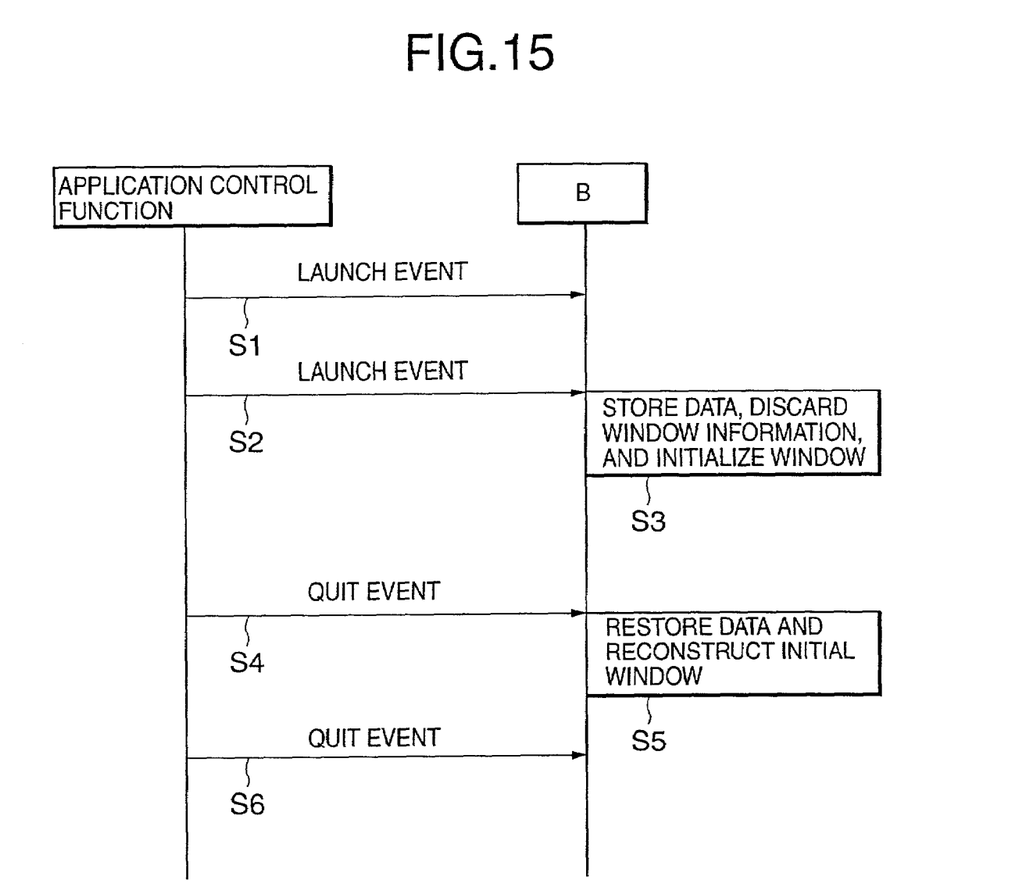
FIG. 15 is a sequence chart showing the operation of the portable telephone set according to the third embodiment of the present invention.

FIG. 13 is a view showing the history data of the portable telephone set according to the third embodiment of the present invention in the initial state. FIG. 14 is a view showing the history data of the portable telephone set according to the third embodiment of the present invention after startup. FIG. 15 is a sequence chart showing the operation of the portable telephone set according to the third embodiment of the present invention.

The operation of the portable telephone set according to the third embodiment of the present invention will be described below with reference to FIGS. 11 to 15. Control operation in a case where when an application is in an activated state, a launch event can be sent again from an application control function 2 to the same application, i.e., the function of an application B needs to be activated while an application A and the application B are active, as shown in FIG. 12, will be described below.

The start-up sequence of the applications A and B is the applications A and B as shown FIG. 13. When the application B is launched, the history management table is set in the state shown in FIG. 14.

The application control function 2 transmits launch events S1 and S2 to the application B. Upon reception of the second launch event S2, the application B stores the data, and the window is initialized (step S3 in FIG. 15).

When the application B quits, the application control function 2 transmits a quit event S4 to the application B. The application B then restores the data and re-draws the initial window (step S5 in FIG. 15). Thereafter, the application control function 2 transmits a quit event S6 to the application B.

What is claimed is:

1. A portable telephone set using a Window System for controlling a rendering timing of a display window of each function, comprising
    history management means for managing a history of the display window of each function;
    priority management means for managing a priority level of the display window of each function said management means at least comparing the priority level of each window from which a launch instruction was received; and
    operation control means for controlling switching of the display window of each function based on management contents of said history management means and said priority management means.

2. A terminal according to claim 1, wherein when a plurality of display windows contend with each other, said operation control means displays the plurality of windows in accordance with the priority levels managed by said priority management means.

3. A terminal according to claim 1, wherein said operation control means controls disposal and reproduction of a window that is not displayed.

4. A terminal according to claim 2, wherein said operation control means controls disposal and reproduction of a window that is not displayed.

5. A window switching control method for a portable telephone set using a Window System for controlling a rendering timing of a display window of each function, comprising:
  receiving a launch instruction for the display window of at least one function; and
  controlling switching of windows of functions based management contents of history management means for managing a history of the display window of each function and priority management means for managing a priority level of the display window of each function by comparing the priority level of each window from which the launch instruction was received.

6. A method according to claim 5, wherein in the step of controlling switching of the windows, when a plurality of display windows contend with each other, the plurality of windows are displayed in accordance with the priority levels managed by the priority management means.

7. A method according to claim 5, wherein in the step of controlling switching of the windows, disposal and reproduction of a window that is not displayed is controlled.

8. A method according to claim 6, wherein in the step of controlling switching of the windows, disposal and reproduction of a window that is not displayed is controlled.

* * * * *